March 1, 1966 J. A. KIMBERLIN ETAL 3,237,951

MAGNETIC TAPE INFORMATION SYSTEM

Filed April 8, 1963 7 Sheets-Sheet 1

INVENTORS
JAMES A. KIMBERLIN
RALPH E. PERRAULT
PAUL J. RICHARTZ

BY FOWLER & KNOBBE
ATTORNEYS

MAGNETIC TAPE INFORMATION SYSTEM

Filed April 8, 1963

7 Sheets-Sheet 2

INVENTORS
JAMES A. KIMBERLIN
RALPH E. PERRAULT
PAUL J. RICHARTZ
By FOWLER & KNOBBE
ATTORNEYS

INVENTORS
JAMES H. KIMBERLIN
RALPH E. PERRAULT
PAUL J. RICHARTZ
BY FOWLER & KNOBBE
ATTORNEYS

MAGNETIC TAPE INFORMATION SYSTEM

Filed April 8, 1963

INVENTORS
JAMES A. KIMBERLIN
RALPH E. PERRAULT
PAUL J. RICHARTZ
By FOWLER & KNOBBE
ATTORNEYS

MAGNETIC TAPE INFORMATION SYSTEM

INVENTORS
JAMES A. KIMBERLIN
RALPH E. PERRAULT
PAUL J. RICHARTZ
BY FOWLER & KNOBBE
ATTORNEYS

INVENTORS
JAMES A. KIMBERLIN
RALPH E. PERRAULT
PAUL J. RICHARTZ
By FOWLER & KNOBBE
ATTORNEYS

March 1, 1966 J. A. KIMBERLIN ETAL 3,237,951

MAGNETIC TAPE INFORMATION SYSTEM

Filed April 8, 1963

7 Sheets-Sheet 7

INVENTORS
JAMES A. KIMBERLIN
RALPH E. PERRAULT
PAUL J. RICHARTZ
By FOWLER & KNOBBE
ATTORNEYS

United States Patent Office 3,237,951

Patented Mar. 1, 1966

3,237,951

MAGNETIC TAPE INFORMATION SYSTEM

James A. Kimberlin, Pasadena, Ralph E. Perrault, Monrovia, and Paul J. Richartz, Pasadena, Calif., assignors, by mesne assignments, to Tel-A-Dex Corporation, Monrovia, Calif., a corporation of California Filed Apr. 8, 1963, Ser. No. 271,338

6 Claims. (Cl. 274—11)

This invention relates to magnetic tape information systems, and has particular reference to a magnetic tape system for storing and selectively playing any of a plurality of audio recordings, as well as specific reference to a multi-speed magnetic tape transport system which utilizes a closed loop of magnetic tape.

In modern times there arises an increasingly acute problem of dissemination of information in the many facilities serving the public. Scores of questions are asked over and over again in ports, air, bus and rail terminals, supermarkets, department stores, and other consumer outlets. In record stores, there is the problem of providing a sampling of the music on a record prior to sale, and large inventories of sample records are maintained for this purpose. There are many examples.

If there was available on the market a reliable and relatively inexpensive machine capable of answering any of a reasonably large number of inquiries in an acceptable manner, no doubt every supermarket, etc., would have one. It is accordingly the primary object of the present invention to provide as nearly as possible such a machine, having a large information capacity and economically suitable, not only for providing flight information at large air termials, etc., but also, for the small commercial outlet as well, such as the supermarket where the information required is the location of various items in the store.

On information system constructed in accordance with the present invention includes a closed loop of magnetic tape for storing a plurality of audio recordings in each one of a plurality of side by side track locations extending around the tape loop. A bin loosely supports a major portion of the closed tape loop in stacked serpentine folds. A tape drive system supports a portion of the tape loop in cooperative relation to the bin for driving the tape at either of two speeds, a relatively slow speed and a relatively fast speed many times greater than the slow speed. A multiple channel recording head is disposed in cooperative relation with the tape drive system, and includes a plurality of separate channels which operatively correspond to the plurality of side by side track locations on the tape. The system includes an audio circuit, means cooperative with the tape drive system for identifying the different recording locations contained in each track on the tape, means for selecting a particular recording head channel and recording location, and electrical controls responsive to the selection means and identifying means. The electrical controls include means for first engaging the tape drive system at fast speed to bring the selected recording location into proximity with the recording head and secondly at slow speed to traverse the selected recording location across the recording head, and means for activating the audio circuit in conjunction with the selected recording head channel during the traverse of the selected recording location across the recording head.

Utilizing a sixteen channel recording head, for example, it is possible to store some two hundred fifty-six separate audio messages each of ten second duration in a loop containing approximately forty feet of magnetic tape, with the system providing almost immediate access to any of these recording locations for the purpose of supplying the information recorded there or for recording new information in the location.

The selection of information from the system may be accomplished, for example, by means of any of a number of push button panels located throughout the facility being served. Often asked questions may be printed adjacent the respective push buttons so that to obtain a response to a particular question, one need only to push the button adjacent the question whereupon the system plays the recorded answer through a speaker located at the panel.

The tape drive system and the bin together comprise a multi-speed magnetic tape transport system which not only forms a major component of the particular audio information system herein, but also is applicable to data recording and processing systems in general.

In the multi-speed tape transport system of the invention, as broadly and separately defined, the bin has a tape entrance opening and a tape exit opening; and, the tape drive system includes first and second rotary capstans aligned with bin entrance opening for driving the tape directionally into the bin at a relatively slow and at a relatively fast speed respectively, means for driving the first and second capstans at a relatively slow and at a relatively fast peripheral speed respectively, and means for alternatively engaging the tape with the first and second capstans.

The foregoing and other major features of the audio information system and the magnetic tape transport system utilized therein, are apparent in the following detailed description, taken in conjunction with the accompanying drawings, in which.

Figure 1:
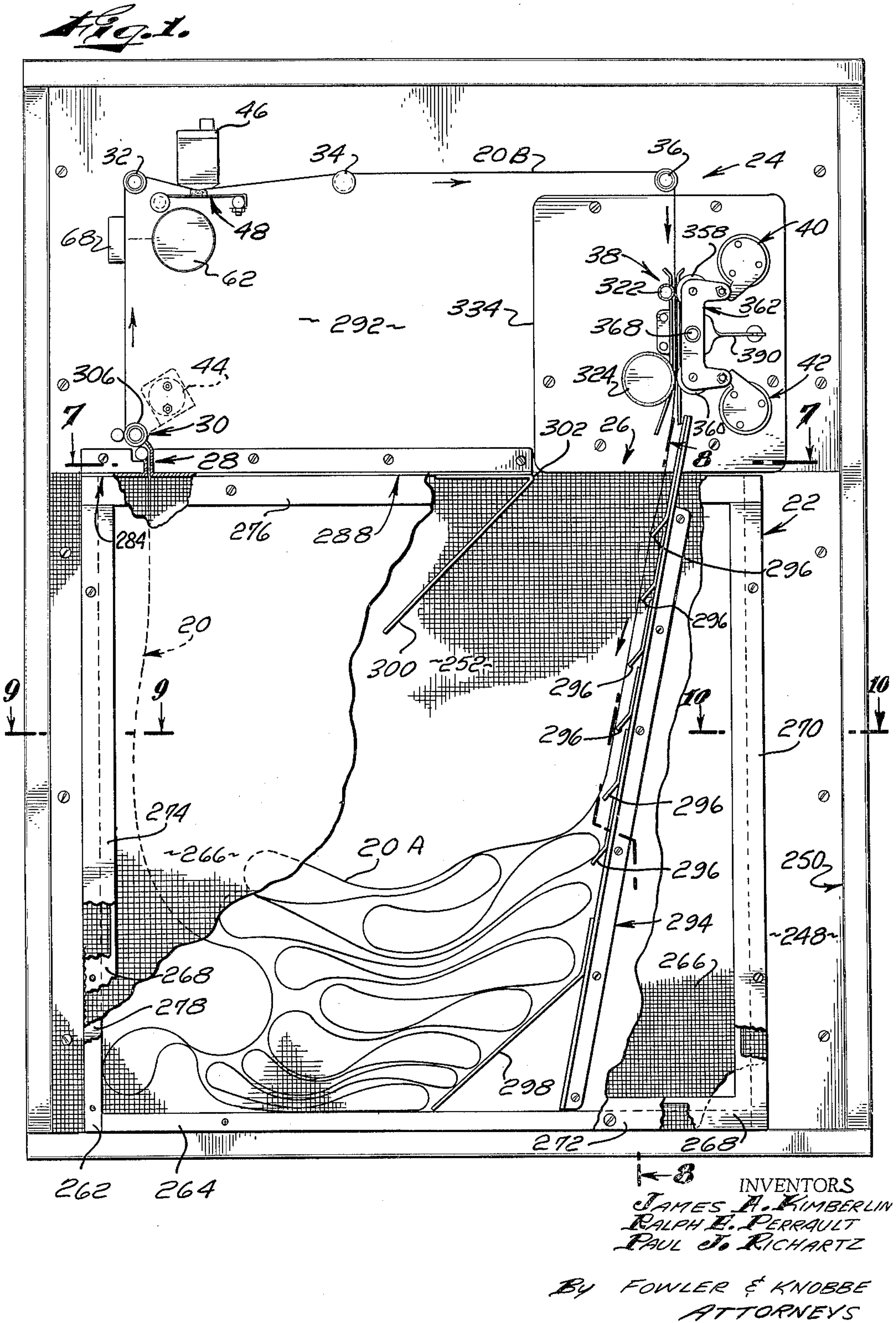
FIG. 1 is a front elevation, partially cut away, of a magnetic tape transport system constructed in accordance with the invention.

The tape transport system shown in FIG. 1 utilizes a closed loop of magnetic tape 20, and includes an upright bin 22 for loosely supporting a major portion 20A of the closed tape loop in stacked serpentine folds, and a tape drive system 24 disposed above the bin for supporting and driving a portion 20B of the tape loop in cooperative relation to the bin.

The bin has a relatively wide entrance opening 26 disposed to one side at the top thereof through which the tape enters into the bin, and a relatively narrow exit opening defined between a pair of closely spaced tape guides 28 disposed to the opposite side at the top of the bin and through which the tape exits the bin.

The tape drive system 24 includes a brake 30, disposed adjacent the bin exit; a first free rotary tape guide 32; a fixed tape guide 34; a second free rotary tape guide 36; and, a capstan drive assembly 38 disposed adjacent to and in vertical alignment with the bin entrance 26. The first and second free rotary tape guides 32, 36 are disposed respectively in vertical alignment with the brake 30 and the capstan drive assembly 38, and the fixed tape guide 34 is disposed in horizontal alignment between the rotary tape guides 32, 36. The tape loop portion 20B extends from the bin exit through the brake 30, over the tape guides 32, 34, 36, and through the capstan drive assembly 38 to the bin entrance 26. The direction of the tape movement is clockwise, as indicated by the arrows.

By means of two rotary solenoids 40, 42, hereinafter referred to as the slow drive and fast drive solenoids respectively, the capstan drive assembly 38 may be engaged to drive the tape directionally down into the bin at either a relatively slow "audio" speed or at a relatively fast "search" speed many times greater than the audio speed.

The brake 30, which normally exerts a very small drag force on the tape, may be actuated by a rotary solenoid 44, hereinafter referred to as the brake solenoid, so as to exert an extraordinary drag force on the tape.

A multi-channel recording head 46 is engaged across the tape at a position between the brake 30 and the capstan drive assembly 38. The recording head includes sixteen side by side transducers 47 (FIGS. 2 and 3) which provide sixteen separate channels for the head. The tape is supported against the recording head by the first rotary tape guide 32 and the fixed tape guide 34 in cooperation with a spring mounted felt pad 48.

The closed loop of magnetic tape 20 is designed to store a plurality of audio recordings in each one of sixteen side by side track locations extending around the loop. These track locations respectively correspond to the separate channels of the multiple channel recording head and are defined by the side by side transducers in the recording head as the tape is driven. In the particular system illustrated, the tape has a width of 1 in. and a thickness of approximately 0.0015 in. It is a conventional strip of Mylar plastic with an iron oxide coating on one side.

Figure 3:
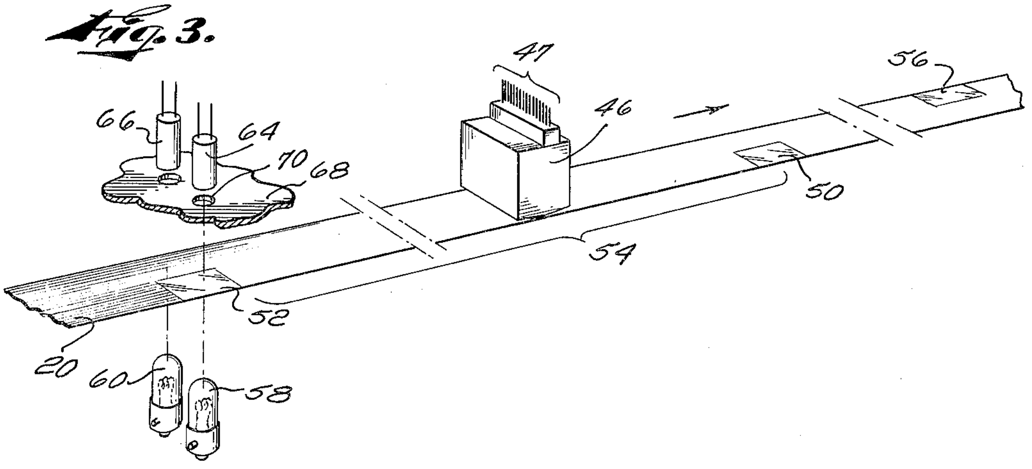
FIG. 3 is a fragmentary schematic perspective illustrating a multi-channel recording head and a photoelectric sensing arrangement, both in cooperative relation to a section of magnetic tape having spaced indicia thereon, in accordance with the invention.

As illustrated in FIG. 3, the closed tape loop 20 has indicia in the form of successive rectangular transparent windows 50, 52 spaced along its length and aligned along one half of the width of the tape. The windows define successive segments of the tape, an example of which is a typical segment indicated by the bracket 54 between the typical successive windows 50, 52. Each successive segment so defined on the tape provides an identifiable storage area for a group of side by side recording locations, corresponding to side by side tracks defined by the multi-channel recording head. The transparent windows are easily formed on the tape by etching off the iron oxide coating from the Mylar with an appropriate solvent, such as methyl-ethyl-ketone.

The distance between any pair of successive windows around the magnetic tape loop is determined by the desired length of the messages or other audio recordings to be stored side by side within the particular tape segment so defined. Segments of different length may be defined on the tape for storing groups of audio recordings of different length; or, the segments may be of uniform length.

The tape loop 20 may provide storage area for a large number of different audio recordings. For example, using an audio tape speed of three inches per second, sixteen ten-second duration vocal messages may be stored in the side by side track locations in a segment of the tape having a length of approximately thirty inches, so that a total of two hundred and fifty-six such messages may be stored in sixteen successive segments of a magnetic tape loop which, allowing for the space occupied by the transparent windows, would include an overall tape length slightly in excess of forty feet.

In order to provide a recognizable point of beginning for the segments around the tape loop, one of the transparent windows is disposed in the opposite one-half portion of the tape, as illustrated at 56 in FIG. 3. The window 56 may be conveniently referred to as the index window, to distinguish it from the other windows which may be conveniently referred to as segment windows.

Figures 9, 10, 11:
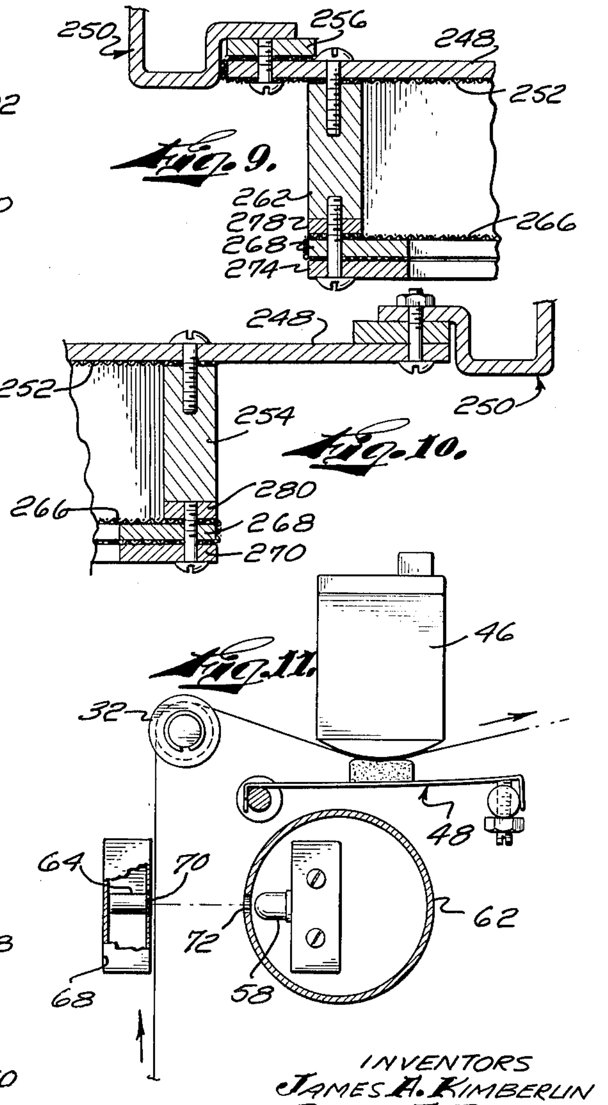
FIG. 11 is an enlarged fragmentary elevation, partially in section, of the recording head arrangement and the photoelectric sensing arrangement mounted on the tape transport system in FIG. 1.

As seen in FIGS. 1, 3 and 11, a photoelectric sensing arrangement is disposed in cooperative relation to the tape at a position slightly in advance of the recording head, and includes a pair of side by side lamps 58, 60 mounted in a lamp housing 62 disposed at a spaced location on one side of the tape, and a corresponding pair of side by side phot diodes 64, 66 mounted in a housing 68 disposed closely adjacent the opposite side of the tape.

The photo diodes and corresponding lamps are disposed respectively in alignment with opposite half portions of the width of the tape, and light is transmitted from the lamps to the photo diodes through correspondingly aligned openings in the respective housings. Thus, one of the photo diodes 64 and its corresponding lamp 58 are aligned with the half width of the tape containing the segment windows 50, 52, and have correspondingly aligned openings 70, 72 in their respective housings 68, 62. This photo diode 64 is sensitive to the passage of the transparent segment windows 50, 52 between it and its lamp 58. The other photo diode 66 is correspondingly sensitive to the passage of the index window 56 between it and its lamp 60, which occurs once each revolution of the closed tape loop.

Figure 2:
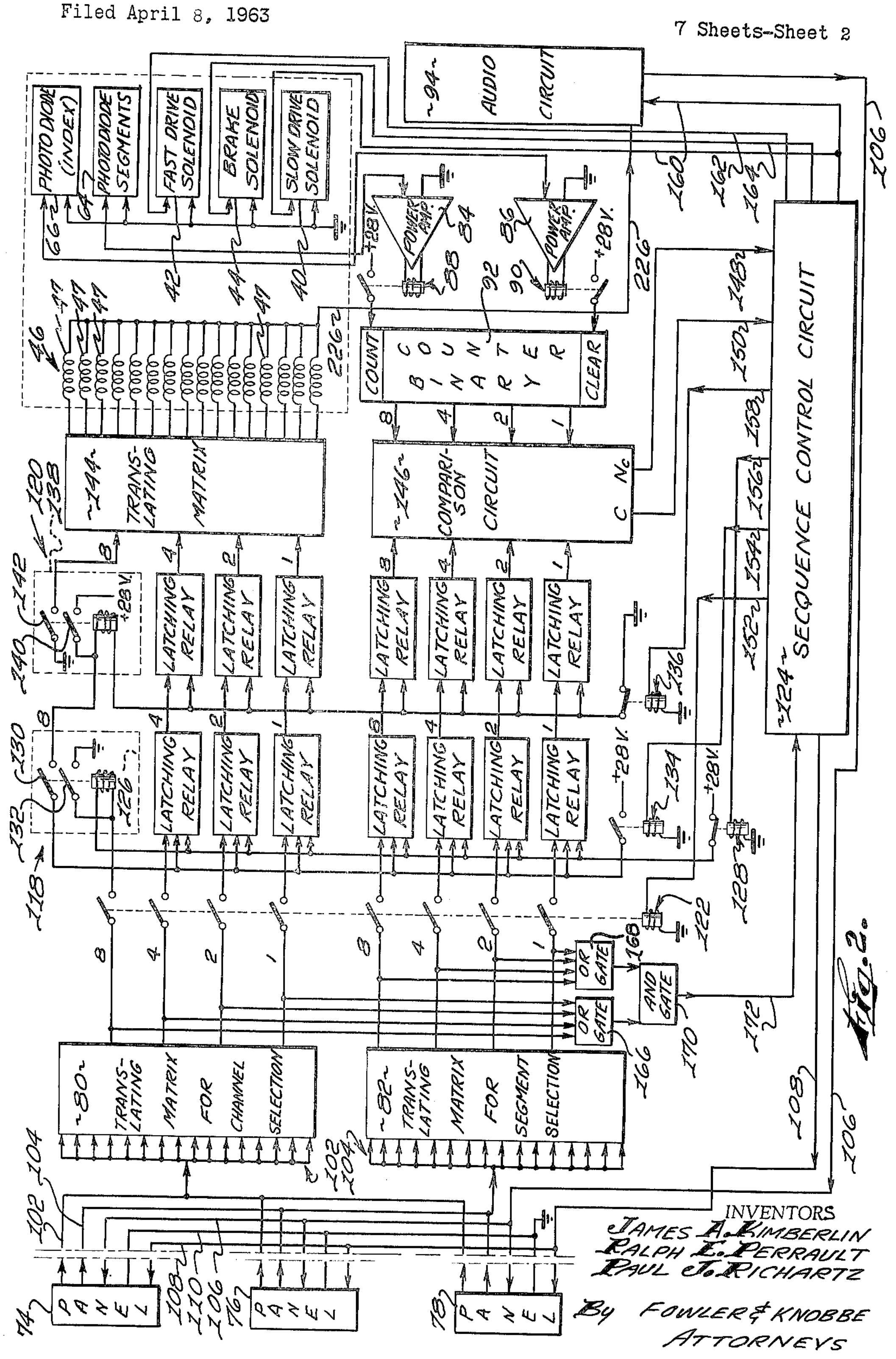
FIG. 2 is an overall schematic circuit diagram of an audio information system for storing and selectively playing any of a plurality of audio recordings, in accordance with the invention.

Referring now to FIG. 2, there is illustrated an overall schematic circuit diagram of the audio information system of the invention, for storing and selectively playing any of a plurality of audio recordings.

In the audio information system shown in FIG. 2, a plurality of identical push button panels 74, 76, 78, together with a translating matrix for channel selection 80 and a translating matrix for segment selection 82, provide a means for selecting a particular tape segment and recording head channel so as to select a particular recording location on the tape. The elements identified within the large dotted line enclosure at the right of the figure are mounted on the tape transport system. The photo diodes 64, 66 together with two corresponding power amplifiers 84, 86 and relays 88, 90, and together with a binary counter 92, provide a means for identifying successive tape segments, cooperative with the tape drive system. An audio circuit is shown at 94. The balance of the circuits shown in FIG. 2 outside the dotted line enclosure, are electrical controls responsive to the selecting means and identifying means.

Figure 4:
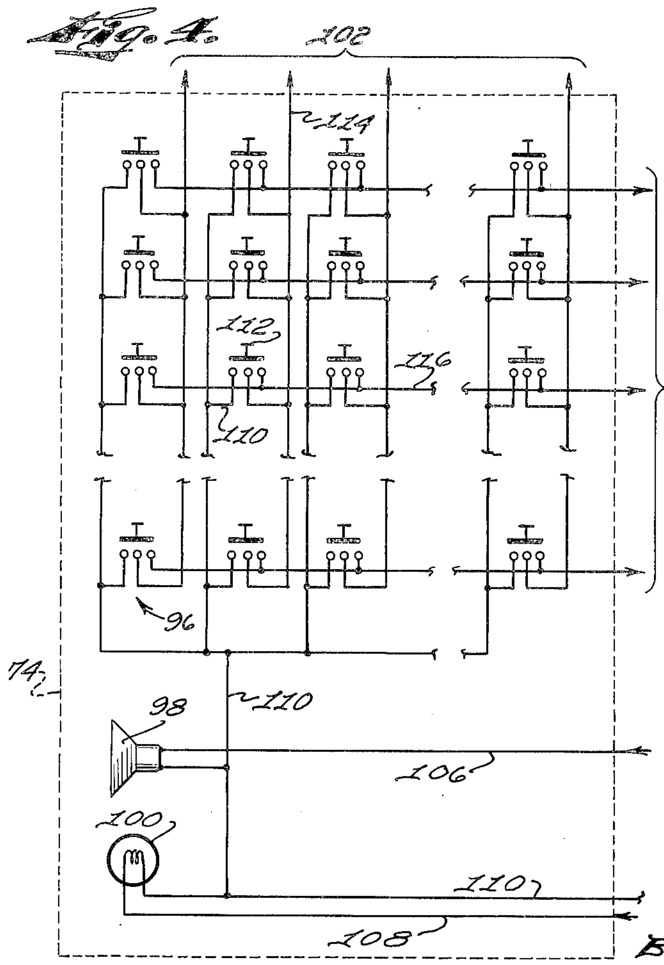
FIG. 4 is a schematic circuit diagram of a typical push button panel included in FIG. 2.

Referring now to FIGS. 2 and 4, a typical push button panel 74 includes a plurality of push buttons 96, a speaker 98, and a busy light 100. There are a total of thirty-five electrical leads running to each panel, including sixteen channel selection leads 102, sixteen segment selection leads 104, a speaker lead 106, a busy light lead 108, and a common ground lead 110. There are a total of two hundred fifty-six push buttons in each panel, arranged in sixteen rows and sixteen columns, many of the rows and columns being broken away in FIG. 4 to conserve space. Inspection will reveal that the depression of any push button will connect the common ground lead 110 to the channel selection lead corresponding to the column containing the push button and to the segment selection lead corresponding to the row containing the push button. For example, depression of the push button 112 located in the second column and third row of buttons, will connect the common ground lead 110 with the channel selection lead 114 corresponding to the second column, and with the segment selection lead 116 corresponding with the third row.

The leads to each of push button panels 74, 76, 78 are broken in FIG. 2 to indicate that the panels may be remotely positioned with respect to the rest of the system, such as at strategic locations around an airline terminal to adequately serve the public with requested flight information. The common ground 110, the speaker lead 106 and the busy light lead 108, are each wired in electrical parallel to the several panels. The same holds true respectively of the sixteen channel selection leads 102 and the sixteen segment leads 104 which, in order to conserve space in FIG. 2, are shown as single cables broken out by brackets into the plurality of leads within each cable where appropriate.

The sixteen channel section leads 102 connected in electrical parallel to each panel run to the translating matrix for channel selection 80. This translating matrix is a conventional diode matrix for translating from decimal to binary code. The matrix has four output leads respectively designated 8, 4, 2, 1 in accordance with the weight value assigned in conventional binary coding, and functions to apply a binary coded pattern of ground connections to these output leads numerically representative of the individual grounded channel selection lead among the sixteen channel selection leads 102.

Similarly, the sixteen segment leads 104 run to the translating matrix for segment selection 82, which is a conventional decimal to binary translator for applying a binary coded pattern of grounds on its output leads designated 8, 4, 2, 1 in accordance with which one of the sixteen segment selection leads 104 is grounded.

The depression of a button at any one of the push button panels produces a binary coded representation of the selected recording head channel and the selected tape segment on the output of the translating matrix 80 and the translating matrix 82 respectively. This selection specifies a particular recording location on the magnetic tape.

A first column of eight latching relays 118 serves as a register for storing binary coded selections, and a second corresponding column of eight latching relays 120 serves as a register for addressing binary coded selections. These two columns of latching relays may be referred respectively as the storage column and the address column, or merely as storage address.

The output from the translating matrix for channel section 80 and from the translating matrix for segment selection 82 is applied through eight contacts of a first control relay 122 to the upper four latching relays and the lower four latching relays respectively of the storage column 118. The contacts of the control relay 122 normally are open. Under appropriate circumstances, which will be explained, upon the depression of a push button at any of the panels, the relay 122 will momentarily close under the control of a sequence control circuit 124, thereby shifting the channel selection and segment selection from the output of the translating matrix 80 and translating matrix 82 respectively to the storage column 118. This operation is referred to as "shift to storage."

The eight latching relays in the storage column 118 are identical and a typical latching relay 126 in this column is shown in detail. Power is supplied to the coil of the latching relay 126 through a normally closed contact of a second control relay 128. The latching relay has two contacts, a latching 132 and a transfer contact 120, both of which are normally open. When one side of the latching relay coil is grounded through the output of the translating matrix 80, power through the normally closed contact of the second control relay 128 causes the latching relay to close its normally open contacts 130, 132. The latching contact 132 maintains the ground connection when closed, hence maintains the latching relay in its actuated state, despite the disappearance of the ground connection on the output of the translating matrix 80. Hence, both contacts of the latching relay 126 remain closed.

Thus, the binary coded pattern of ground connections on the outputs of the translating matrix 80 and translating matrix 82 are shifted to a corresponding pattern of actuated latching relays in the storage column 118. These binary coded patterns, representing a selected recording head channel and a selected tape segment respectively, will be preserved in the storage column 118 until, under the control of the sequence control circuit 124, the second control relay 128 is actuated to open its contact and remove power to the latching contacts, an operation which is referred to herein as "unlatch storage."

The binary coded patterns in the storage column 118 are shifted to the address column 120 upon the closure of the normally open contact of a third control relay 130, under the control of the sequence control circuit 124, an operation referred to herein as "shift to address." Closure of the normally open contact of the third control relay 130 supplies power through the transfer contacts of the actuated latching relays in the storage column 118, which connect over leads designated 8, 4, 2, 1 to the coils of corresponding latching relays in the address column 120 and through these coils and the normally closed contact of a fourth control relay 136 to ground. Thus, by actuation of the third control relay 134, the pattern of actuated latching relays in the storage column is transferred to an identical pattern of actuated latching relays in the address column.

The latching relays in the address column are typified by a latching relay 138. This latching relay 138 includes a latching contact 140 and a transfer contact 142, both normally open. When power is supplied through the closed transfer contact 130 of the coresponding latching relay 126 in the storage column, latching relay 138 in the address column is energized and closes its contacts. The latching contact 140 in its closed position maintains power through the coil of the latching relay 138 after disappearance of the power supplied through the transfer contact 130. Once actuated, the latching relay 138 remains in its actuated state, until the fourth control relay 136 opens its normally closed contact under control of the sequence control circuit 124, an operation referred to herein as "unlatch address."

The transfer contacts of the upper four latching relays in the address column 120 are coupled to a conventional binary to decimal translating matrix 144 over leads designated 8, 4, 2, 1; and, similarly, the transfer contacts of the lower four latching relays in the address column 120 are coupled to a comparison circuit 146 over leads similarly designated 8, 4, 2, 1. As can be seen from the transfer contact 142 of the latching relay 138, the net result is that the binary coded pattern of actuated latching relays in the upper set of four are applied as a binary coded pattern of ground connections over the leads 8, 4, 2, 1 to the translating matrix 144; and, the binary coded pattern of actuated latching relays in the lower set of four is applied as corresponding ground connections over the leads 8, 4, 2, 1 to the comparison circuit 146.

The translating matrix 144 is a conventional diode circuit for converting from binary to decimal code, and responds to the binary coded pattern of ground connections on the leads 8, 4, 2, 1 to ground the corresponding one of the sixteen recording transducers 47 of the recording head 46.

The comparison circuit 146 is a conventional circuit for comparing the binary pattern reflected by the state of actuation of the lower set of four latching relays in the address column with the binary pattern reflected by the count of the binary counter 92. The binary pattern from the latching relays represents the numerical identification of the selected segment on the tape, and the binary pattern of the counter 92 represents the numerical identification of the tape segment coming into proximity with the recording head. The counter 92 is driven by the segment photo diode 64 through the associated power amplifier 84 and relay 88, reflecting pulses generated by the photo diode as a result of the passage of the segment windows thereby. The counter is cleared each revolution of the tape by the pulse generated by photo diode 66 in response to the passage thereby of the index window 56 on the magnetic tape, the pulse being applied to the clear terminal of the counter through the associated power amplifier 86 and relay 90.

Normally, the comparison circuit provides an output voltage designated "NC" (meaning non-comparison) over a lead 148 running to the sequence control circuit 124. When the count of the counter reaches identity with the numerical designation of the selected segment, the comparision circuit ceases the "NC" voltage and supplies instead an output voltage designated "C" (meaning comparision) over a lead 150 running to the sequence control circuit 124. This informs the sequence control circuit that the selected segment of the tape has arrived proximate the recording lead.

The primary control circuit of the system is the sequence control circuit 124. This circuit controls the actuation of the control relays 122, 134, 128, 136 over control leads 152, 154, 156, 158 respectively running to the coils of the relays. The sequence control circuit also controls the actuation of the slow drive, fast drive and brake solenoids 40, 42, 44 over control leads 160, 162, 164 respectively; and, over control lead 160, also controls the activation of the audio circuit 94 in conjunction with the selected recording head channel. The busy light lead 108 also comes from the sequence control circuit.

The system in FIG. 2 has a capacity for accommodating two channel and segment selections, one in the address column 120 and the other in the storage column 118. Thus, beginning with an empty address column and storage column, two panel buttons may be depressed and the selection represented by each button will be accepted, the busy lights at all panels turned on over the lead 108 from the sequence control circuit, and further selections will not be accepted by the system until one of the selections already accepted by the system finishes its operation. The single storage column 118 is illustrative, and if additional selection storage is desired, additional columns may be added with appropriate controls for shifting the selections from column to column in the fashion of a shift register.

Figure 6:
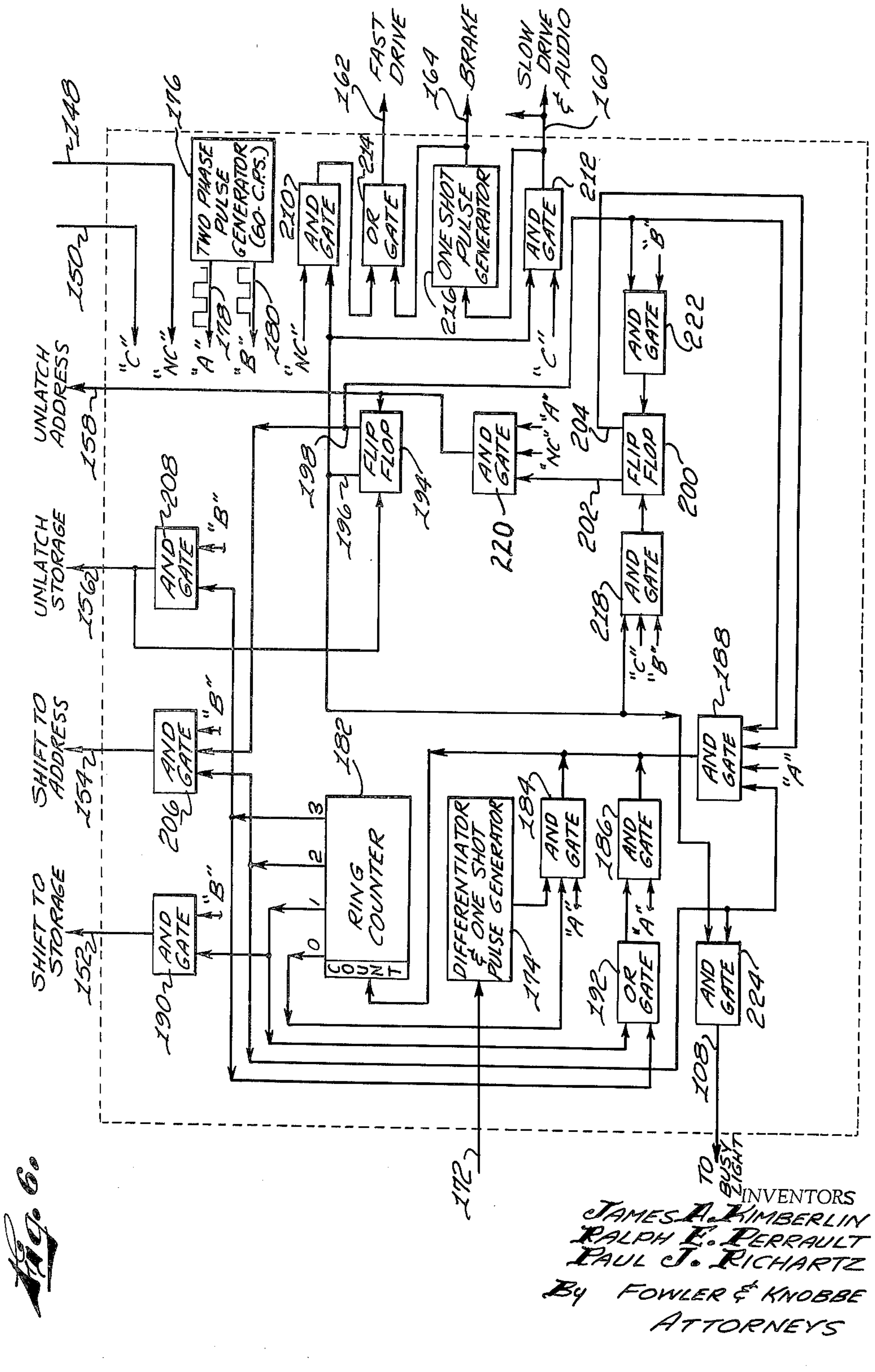
FIG. 6 is a schematic circuit diagram of the sequence control circuit of FIG. 2.

When a button on any panel is depressed, at least one of the output leads from the translating matrix for channel selection 80 and at least one of the output leads from the translating matrix for segment selection 82, will have a ground connection. The occurrence of this fact is sensed by first and second "OR" gates 166, 168 respectively coupled to the output leads of the translating matrices 80, 82. The output of the respective "OR" gates 166, 168 run to an "AND" gate 170 which, with an output present from both "OR" gates, provides a signal over its output lead 172 to a differentiator and one-shot pulse generator 174 in the sequence control circuit 124 (FIG. 6). The "AND" gate 170 assures that the button on the panel is completely depressed prior to transfer of the selection into the storage column 118, so that no false selection is transferred to storage.

Upon receipt of the signal from the "AND" gate 170 over lead 172, the sequence control circuit 124 instantly provides a momentary actuation of the first control relay 122 to shift the selection to the storage column, providing that the storage column is empty. Since this action involves the differentiator and one-shot pulse generator 174 in the sequence control circuit, and since it occurs so rapidly, the selection is instantaneously accepted or rejected upon depressing the button and no further selection can be made until the button is released, so that potential ambiguity from the possibility of the simultaneous pushing of two buttons or potential ambiguity which otherwise arise from holding a button in a pushed position, is avoided as a practical matter.

Referring now to FIG. 6, the construction and operation of the sequence control circuit will be described in detail. In FIG. 6, there is included a two-phase pulse generator 176 which provides a series of "A" clock pulses at 60 cycles per second on one output lead 178, and a series of "B" clock pulses on a separate output lead 180, the "B" clock pulses being 180° out of phase with the "A" clock pulses. In order to avoid cluttering the figure with a multitude of leads, the clock pulses as well as the outputs from the comparison circuit over leads 148, 150 are applied to the various gates in the circuit by truncated arrows with accompanying designations "A," "B," and "C" (meaning compare) and "NC" (meaning non-compare).

The heart of the sequence control circuit is a ring counter 182 which counts from 0 to 3 as indicated, in cycles. The ring counter 182 receives pulses at its count terminal through any one of three "AND" gates 184, 186, 188.

Upon the depression of a push button in one of the panels, the differentiator and one-shot pulse generator 174 supplies a pulse to "AND" gate 184, this pulse being twice the duration of an "A" pulse. Voltage output from the "0" stage of the ring counter is applied to "AND" gate 184, as are the "A" clock pulses. Hence, with the ring counter setting on "0" an "A" clock pulse produces an output from "AND" gate 184 which counts the ring counter to "1," causing the voltage to disappear on its "0" terminal and to appear on its "1" terminal. The "1" terminal of the ring counter is connected to an "AND" gate 190 to which "B" clock pulses are applied, so that the "B" clock pulse which immediately succeeds the "A" clock pulse that counted the ring counter to "1" will appear on the output lead 152 of the "AND" gate 190, and produce a shift to storage of the selection made by the button, the depression of which actuated the differentiator and one-shot pulse generator 174.

The "1" terminal of the ring counter also runs to an "OR" gate 192 and thence to "AND" gate 186, which receives as well the "A" clock pulses. Thus, the "A" clock pulse succeeding that which counted the ring counter from "0" to "1," counts the ring counter from "1" to "2." Upon arrival at its "2" terminal a voltage is applied thereon by the ring counter and the voltage previously applied on the "1" terminal is ceased.

A number of operations are involved with the "2" terminal of the ring counter, and these operations involve various elements of the sequence control circuit. A flip-flop circuit 194, called the message playing flip-flop, has a set terminal 196 and a re-set terminal 198. A second flip-flop circuit 200, called the compare flip-flop, has a set terminal 202 and a re-set terminal 204. The message playing flip-flop 194 is at its set terminal 196 during the search for and the playing of a recording storage location past the recording head; otherwise, it is on its re-set terminal 198. The compare flip-flop 200 is on its set terminal 202 during the time a selected recording location is passing under the recording head; and, is otherwise on its re-set terminal 204. Thus, when the system is at rest, both the message playing flip-flop 194 and the compare flip-flop 200 are on their respective re-set terminals.

The "2" terminal of the ring counter is connected to an "AND" gate 206. The re-set terminal 198 of the message playing flip-flop 194, and "B" clock pulses, are also connected to this "AND" gate 206. Thus, so long as a search for or a playing of the selected recording location is not currently in progress, the "B" clock pulse next following the "A" clock pulse that counted the ring counter to terminal "2" will appear on the output lead 154 of the "AND" gate 206, and cause a shift to address. Otherwise the shift to address will await the finish of an in-progress search and playing of a selected recording location, whereupon the message playing flip-flop returns to its re-set terminal 198, and the succeeding "B" pulse appears on the output of the gate.

The "2" terminal of the ring counter 182 also connects to the "AND" gate 188, as do the re-set terminals 198, 204 of the respective flip-flops, and the "A" clock pulses. Thus, upon arrival of the ring counter at "2," if no search for or playing of a selected recording location is in progress, the "A" clock pulse succeeding the "B" clock pulse producing the shift to address operation through "AND" gate 206, will appear on the output of "AND" gate 188 to count the ring counter from "2" to "3."

The "3" terminal of the ring counter connects to an "AND" gate 208 to which "B" clock pulses are supplied. The "B" clock pulse which succeeds the "A" clock pulse that counted the ring counter to "3" will appear on the output 156 of the gate and produce an unlatch storage operation as well as trigger the message playing flip-flop 194 to its set terminal 196. The "3" terminal of the ring counter is also coupled to the "OR" gate 192, the output from which runs to the "AND" gate 186 to which "A" pulses are applied, so that the "A" pulse succeeding the "B" pulse on the output of "AND" gate 208 counts the ring counter back to its "0" terminal.

The message playing flip-flop 194 is now on its set terminal 196. This set terminal is coupled to first and second "AND" gates 210, 212 to which the "NC" voltage and the "C" voltage is applied respectively, as present on the output leads 148, 150 of the comparison circiut 146. With a new selection just shifted to address, it would be expected that the "NC" voltage would be present so that the first "AND" gate 210 would provide a voltage output through an "OR" gate 214 to the fast drive solenoid 42 of the capstan drive assembly over lead 162. Accordingly, the tape is driven at search speed until the "NC" voltage disappears and the "C" voltage appears on the output of the comparison circuit. At this point, the selected tape segment is proximate the recording head, and the second "AND" gate 212 provides a voltage over lead 160 to activate the slow drive solenoid 40, and to activate the audio circuit 94 in conjunction with the selected recording head channel during the traverse of the selected tape segment across the recording head. The output voltage of the second "AND" gate 212 on lead 160 is also applied to a one-shot pulse generator 216 which produces a pulse of approximately 20 milliseconds duration on control lead 164 running to the brake solenoid 44. This 20 millisecond pulse is also supplied through "OR" gate 214 to the control lead 162 running to the fast drive solenoid, the consequences of which will be explained later.

After the selected recording location has played past the recording head, the "C" voltage from the comparison circuit will disappear, so that the output voltage from "AND" gate 212 on lead 160 will disappear and release the slow drive solenoid 40 and the audio circuit 94.

The set terminal 196 of the message playing flip-flop 194 also connects to an "AND" gate 218, which receives as well the "C" voltage and the "B" clock pulses. Thus, when a search for a selected recording location begins, and immediately following the finding of this selected storage location whereupon the "C" voltage is supplied, the next succeeding "B" clock pulse will appear on the output of the "AND" gate 218 and trigger the compare flip-flop 200 to its set terminal 202. The set terminal 202 of the flip-flop 200 is coupled to an "AND" gate 220 to which the "NC" voltage and the "A" clock pulses are also applied. When the "NC" voltage appears following the playing of the selected recording location, the next succeeding "A" clock pulse appears on the output lead 158 from the "AND" gate 220, and both re-sets the message playing flip-flop 194 to its re-set terminal 198 and produces an unlatch address operation, which clears the address column 120.

The return of the message flip-flop to its re-set terminal 198 permits the succeeding "B" clock pulse to appear on the output of an "AND" gate 222, which triggers the compare flip-flop 200 to its re-set terminal 204.

If during the course of playing the selection just described another push button is depressed on one of the panels, the ring counter 182 will count to "1" producing a shift to storage, then count to "2," and remain at its "2" terminal until both flip-flops 194, 200 are reutrned to their re-set terminals to energize "AND" gate 188. During this time, an output voltage will be supplied by an "AND" gate 224 to which the "2" terminal of the ring counter and the set terminal 196 of the message playing flip-flop are applied. This output voltage is supplied over the lead 108 to the busy lights in all of the panels. If during this time while the ring counter is setting on count "2" another push button is depressed in one of the panels, the selection thereby made will be rejected because no shift to storage will be produced.

Figure 5:
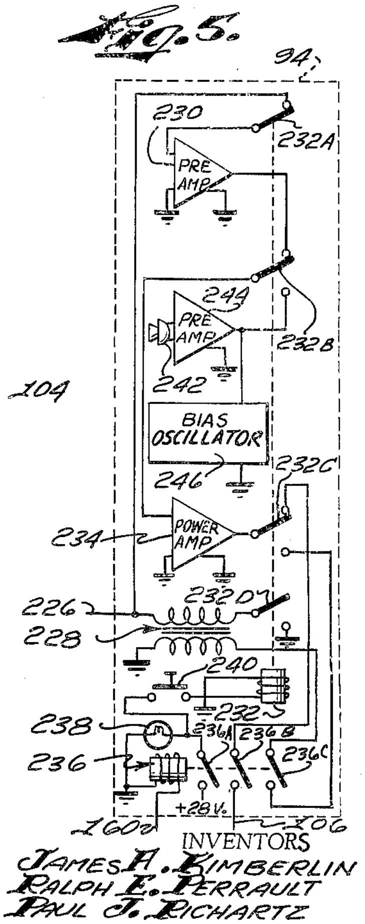
FIG. 5 is a schematic circuit diagram of the audio circuit of FIG. 2.

Referring now to FIGS. 2 and 6, the channel selection in the address column 120 produces a ground connection on the corresponding one of the sixteen transducers of the recording head 46 through the translating matrix 144. The sixteen transducers of the recording head 46 are connected in parallel to an audio access lead 226 from the audio circuit 94. At the audio circuit, seen in FIG. 5, this lead 226 connects to one side of a transformer 228, and also is coupled to a play preamplifier 230 through a normally closed contact 232A of a relay 232, referred to as the play-record relay.

The play-record relay 232 has first, second, third and fourth contacts 232A, 232B, 232C, 232D, respectively shown in their normal position for completing a circuit for playing information from the tape. When this relay is actuated, the contacts complete a recording circuit, and break the playing circuit.

In the playing circuit, the play preamplifier 230 is coupled through the second contact 232B of the play-record relay 232 to a power amplifier 234, which is in turn coupled through the third contact 232C of the play-record relay to a normally open contact 236B of an audio control relay 236.

The audio control relay 236 has first, second and third normally open contacts 236A, 236B, 236C. This relay is actuated over lead 160 to close its normally open contacts during the time a selected tape segment is passing under the recording head 46. The closure of its second contact 236B connects the power amplifier 234 to the speakers in all push button panels over the speaker lead 106 so that the selected recording is heard.

Information may be recorded in any selected recording location through the audio circuit. In this connection, it must be appreciated that the operator has a push button panel available so that he may make a selection. By observing a record light 238, which is connected to power through the first contact 236A of the audio relay 236, the operator is advised of the passage of the selected recording storage location under the recording head, hence is advised of when to record.

To record in a selected recording location, the operator closes a manual switch 240 and presses the appropriate push button on his panel. When the selected recording location begins to pass under the recording head, the control relay 236 will be actuated causing the light 238 to go on and supply power through the manual switch 240 to actuate the play-record relay 232. Actuation of the play-record relay breaks the playing circuit and establishes the recording circuit through its contacts.

In the recording circuit, a microphone 242 is coupled to a record preamplifier 244, the output from which in conjunction with that from a bias oscillator 246 runs through the second contact 232B of the play-record relay 232 to the power amplifier 234. From the power amplifier, the circuit is through the third contact 236C of the control relay 236 to one side of the transformer 228, the opposite side of the transformer being coupled at one end to the lead 226 running to the recording head transducers and at the opposite end to ground through the fourth contact 232D of the play-record relay.

The play-record relay 232 remains actuated during the passage of the selected recording location under the recording heads; that is, during the time the control relay 236 remains actuated. The light 238 is on during this time, so that after the recording is made, the operator knows when to release the manual switch 240.

Considering now the physical structure of the tape transport system with reference to FIGS. 1 and 7 to 10, the tape bin 22 is supported on a lower main plate 248, which is in turn mounted across the lower portion of a rectangular supporting framework 250. The rear face of the bin is defined by a metallic screen 252 stretched across the face of the plate 248, one edge of the screen 252 being secured under a metal bar 254, the opposite edge being lapped around the plate 248 and secured by a metal strip 256, and the bottom and top of the screen 252 respectively being lapped around the bottom and top of the plate 248 and secured by metal strips 258, 260 respectively.

The oposite sides and bottom of the bin are generally defined by three metal bars 254, 262, 264 respectively, secured to the plate 248.

The front interior face of the bin is defined by a second metal screen 266 held parallel to the rear screen 252 by a rectangular supporting assembly connected to the bars 254, 262, 264, which define the sides and bottom of the bin. The rectangular supporting assembly includes a thin rectangular frame member 268 around the edges of which the screen 266 is secured in lapped fashion by four outer metal strips 270, 272, 274, 276 extending around the full perimeter of the frame 268, and by three rear metal strips 278, 280, 282 respectively secured along the rear side edges and bottom edge of the frame 268, and matching in width the bars defining the sides and bottom of the bin. The rectangular supporting assembly and front screen are connected together as a unit, and may be removed as a unit from the bars defining the sides and bottom of the bin.

The top of the bin is only partially covered so as to leave tape entrance and exit openings. A first top cover plate 284 has an upright flange thereon 286 which functions as one of the pair of tape guides 28 at the bin exit. A second top cover plate 288 has an upright flange 290 thereupon which serves as the other of the pair of tape guides 28 defining the bin exit. The interior spacing between the pair of tape guides 286, 290 is about 0.0030 inch. This prevents the tape from being withdrawn through the bin exit in folds, yet at the same time permits splices in the tape to pass through the bin exit.

The first and second top covers 284, 288 are held in position by securing them to an upper main plate 292 which mounts various elements of the tape drive system, and which is secured across the top of the rectangular supporting frame 250 and disposed nearly in coplanar alignment with the lower main plate 248.

Included in the tape bin is a long tape guide structure 294 which slopes downwardly at an angle of about 20° off of vertical from a position adjacent the capstan drive assembly 38, through the entrance opening 26 of the bin, and to the bottom of the bin. The tape guide structure has a series of louvers 296 spaced along its length for guiding the tape with minimum surface contact. These louvers are in the form of upturned tabs, each tab sloping at an angle of about 45° from the vertical, and the tabs being of uniform length so that the loci of their spaced edges follows the general 20° slope of the tape guide assembly 294.

At the lower end of the tape guide assembly 294, there is a long louver 298 which assists in properly stacking the folds of tape 20A in the bin.

Figure 7:
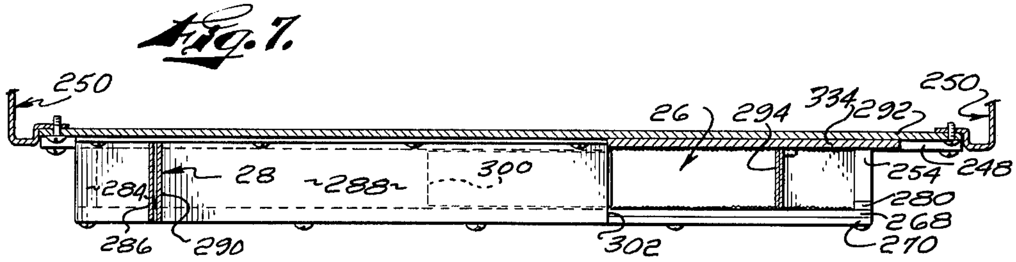
FIGS. 7, 8, 9 and 10 are fragmentary sections taken along lines 7—7, 8—8, 9—9, 10—10, respectively, of FIG. 1, and generally illustrate details of the tape bin.
Figure 8:
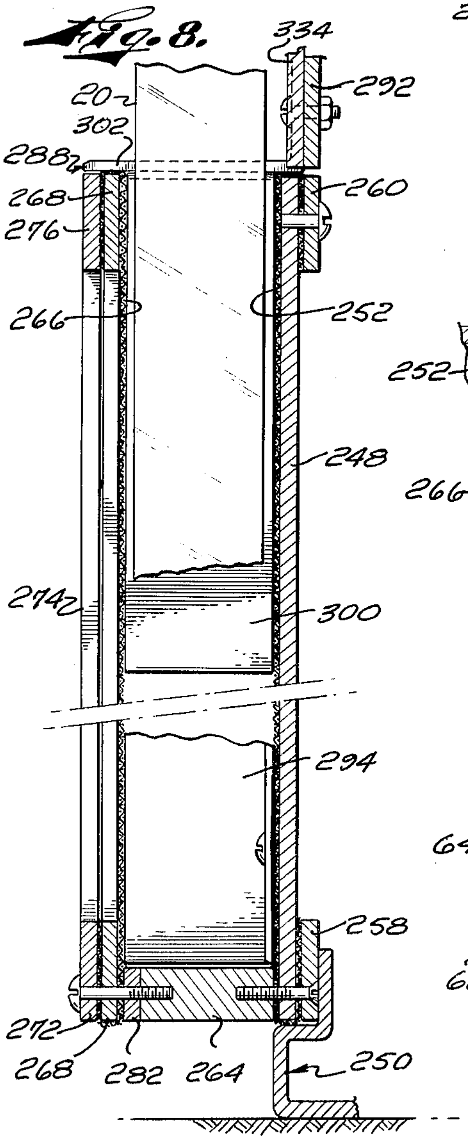

The tape guide assembly 294 is mounted on the lower main plate 248 and, as best seen in FIGS. 7 and 8, extends across the width of the bin between the screen walls. Thus, the tape guide 294 serves operatively as the sidewall of the bin adjacent the bin entrance.

The bin includes a second internal tape guide 300 which slopes downwardly at an angle of about 45° off of vertical from one side of the tape entrance opening 26, extends for a relatively short distance, and terminates more or less along the center line of the bin at a point located at about one fourth the depth of the bin. This tape guide is connected to the underside of the cover plate 288, and as best seen in FIG. 8, occupies the width of the bin between the screen walls.

The bin entrance 26 is defined by the parallel screen walls 252, 266, and at opposite sides by an edge 302 of the cover plate 288 on the one hand and the tape guide assembly 294 on the other hand. The horizontal distance between the edge 302 on the top cover and the tape guide assembly 294 is approximately three inches; hence, the bin entrance is much wider than the bin exit.

Referring to FIG. 8, it will be seen that the width of the bin between the screen walls is slightly greater than the width of the tape 20. The width of the tape 20 is one inch, and the interior distance between the parallel screens 252, 266 is 1.125 inches, or ⅛ of one inch wider than the tape. These overall dimensions, plus the air passage provided by the openings in the screens, permit the tape to flow freely in the bin, yet maintain the tape in stacked serpentine folds.

Figures 12, 13, 14:
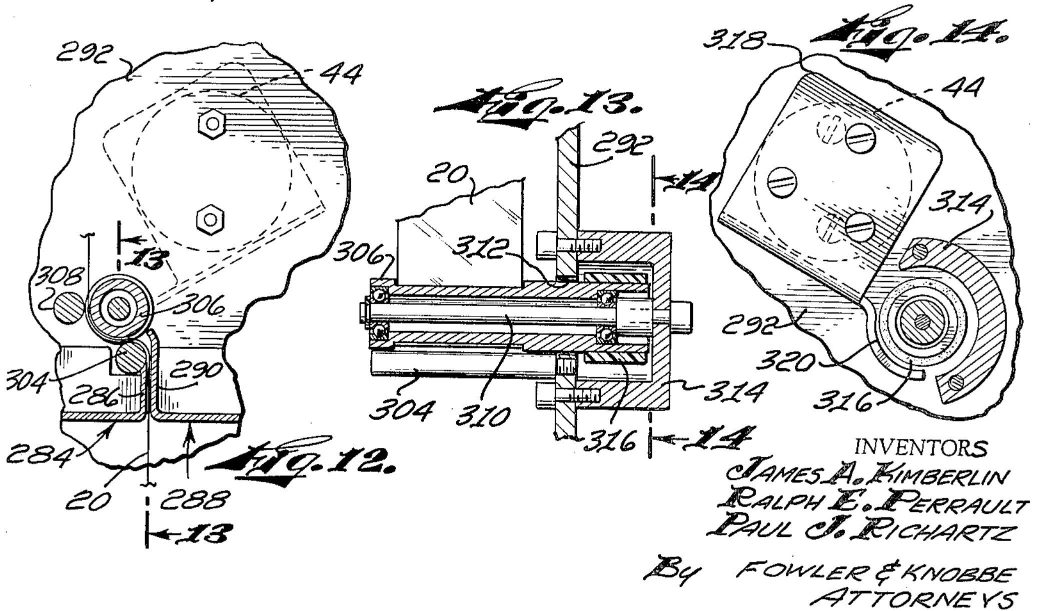
FIG. 12 is an enlarged fragmentary sectional elevation of the tape brake disposed adjacent the bin exit in FIG. 1.
FIG. 13 is a fragmentary sectional elevation taken along line 13—13 of FIG. 12.
FIG. 14 is a fragmentary rear elevation, partially in section, of the tape brake structure taken along line 14—14 of FIG. 13.

Referring now to FIGS. 12, 13, and 14, the structure of the brake includes a fixed tape guide 304 disposed in peripheral alignment with the tape exit opening defined between the tape guides 286, 290. A rotary tape guide 306 called the brake roller is disposed above and peripherally adjacent the fixed tape guide 304. A second fixed tape guide 308 disposed horizontally adjacent the brake roller 306. The two fixed tape guides 304, 308 guide the tape in a sepentine path from the bin exit around the periphery of the brake roller 306 wherefrom the tape passes vertically to the aligned periphery of the rotary tape guide 32 of the tape drive system. The periphery of the brake roller 306 may be surfaced with rubber (not shown) to provide more positive engagement with the tape.

The brake roller 306 is mounted in bearings on an a axle 310 and extends through an accommodating opening 312 in the upper main plate 292 which mounts elements of the tape transport system. The axle 310 is fixed to a partial housing 314, the partial housing being secured rigidly to the plate 292. Within the partial housing 314, the end of the brake roller 306 is fitted with an exterior brake lining 316. The brake lining is preferably in the form of a nylon ring rigidly secured to the brake roller.

Mounted on the rear side of the plate 292 is the brake solenoid 44. A bracket 318 having an arcuate tang 320 extending therefrom is connected to the rotary solenoid. The arcuate tang 320 extends adjacent to and matches the curvature of the brake lining 316. Normally the tang is kept out of contact with the brake lining by the conventional return spring contained in the solenoid. When the solenoid 44 is actuated, rotation occurs in the direction of the arrow which presses the arcuate tang 320 against the brake lining 316, so as to provide a frictional force which opposes rotation of the brake roller 306 by the tape.

The close engagement of the tape 20 around the periphery of the brake roller 306 causes the brake roller to rotate when tape is pulled from the bin exit by the tape drive system. The brake is momentarily actuated to provide an extraordinary drag force thereby keeping the tape loop 20B taut, when the tape drive system makes the change from fast to slow speed.

The normal drag force exerted on the tape loop in the tape drive system is provided by the various tape guides, and especially by the spring mounted felt pad 48 which engages the tape against the recording head 46. The spring pressure on this pad is adjustable by means of the mechanism shown.

Referring now to FIG. 1 in conjunction with FIGS. 15 to 18, the capstan drive assembly 38 includes first and second rotary capstans 322, 324 aligned with the bin entrance opening 26 for driving the tape 20 directionally into the bin at a relatively slow audio speed and at a relatively fast search speed respectively. As is especially apparent in FIG. 1, the respective peripheries of the capstans 322, 324 are aligned tangent to a substantially vertical path extending from the rotary tape guide 36 and intersecting the tape guide assembly 294 at a position adacent the bin entrance and slightly above the uppermost louver 296 of the tape guide assembly.

Figures 15, 16:
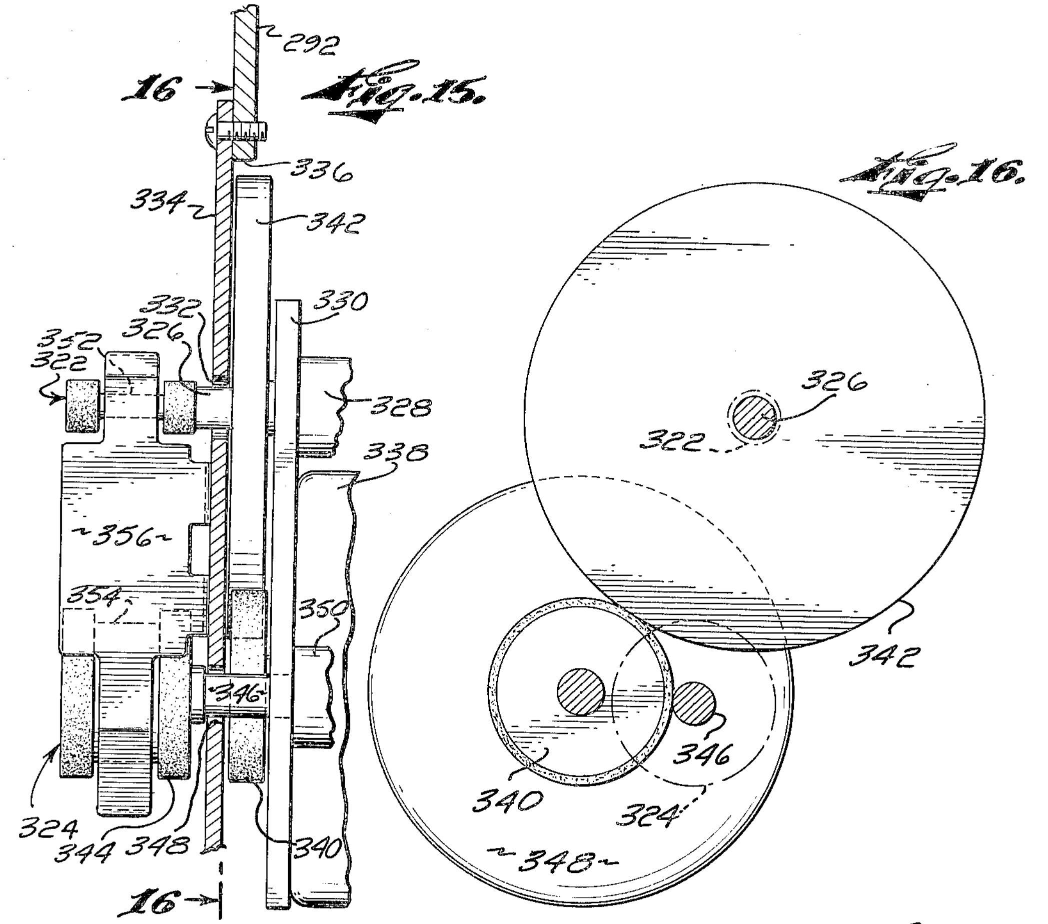
FIG. 15 is a fragmentary view, partially in section, of the tape drive capstans, associated tape guide, and mechanism for driving the capstans, of the tape transport system of FIG. 1.
FIG. 16 is a sectional elevation taken along line 16—16 of FIG. 15, and generally illustrates the motor and power train for driving the capstans.

As best seen in FIG. 15, the slow drive capstan 322 is formed on the end of a stub shaft 326 which extends from a supporting journal 328 fixed on the rear side of a motor mount 330. The stub shaft 326 extends through an accommodating opening 332 in a cover plate 334, which covers a large access opening 336 in the upper main plate 292.

An electric motor 338 mounted on the motor mount 330 drives a rubber surfaced friction wheel 340 at constant speed. The friction wheel 340 is engaged with a large metal wheel 342 fixed on the stub shaft 326, and serves as both a fly wheel and as a gear reduction for continuously driving the upper capstan 322 at a slow, constant peripheral speed. The motor mount 342 is securely mounted on the frame 250 by means not shown.

The lower or fast drive capstan 324 is formed on a collar connected on the end of a stub shaft 346, the stub shaft in turn extending through an accommodating opening 348 in the cover plate 344 to a journal support 350 mounted on the motor mount 330. The friction wheel 340 engages the stub shaft 346 and continuously drives the capstan 324 at a fast speed.

The capstans 311, 324 have aligned central channels 352, 354 thereon which divide their peripheries into side by side annular areas, such as the one indicated at 344. A first tape guide 356 extends vertically between the capstans, the tape guide ends passing within the confines of the peripheral channels 352, 354 in the capstans so as to not interfere with the driving of the tape by engagement therewith of the outer periphery of the capstans. For positive engagement with the tape, the outer peripheries of the capstans are surfaced with rubber, as indicated.

Figures 17, 18:
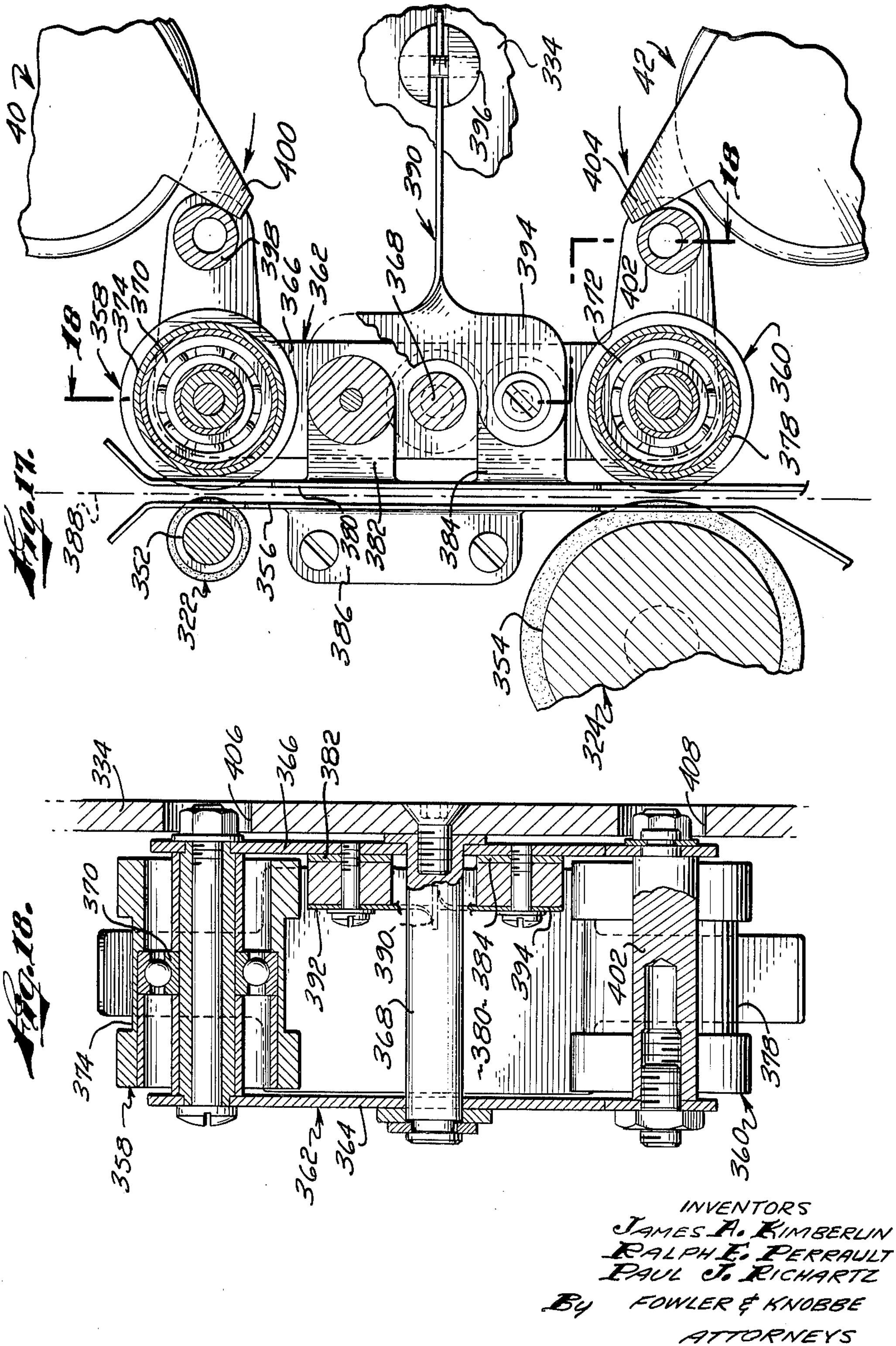
FIG. 17 is an enlarged sectional elevation, partially broken away, of the capstan drive assembly, of the tape transport system of FIG. 1; and, FIG. 18 is a sectional elevation taken along line 18—18 of FIG. 17.

Referring to FIGS. 17 and 18, first and second pinch rollers 358, 360 are disposed closely adjacent and in horizontal alignment with the first and second capstans 322, 324 respectively. The pinch rollers are mounted at opposite ends of a common supporting frame 362, which comprises spaced parallel arms 364, 366. By means of a central axle 368 fixed to the cover plate 334 and extending through the arms 366, 364 of the common supporting frame, the frame is supported pivotally on an axis disposed between the pinch rollers. The pinch rollers 358, 360 are respectively mounted between the parallel arms 364, 366 on single roller bearings 370, 372 respectively, so that they have a very slight amount of wobble or play with respect to their axes of rotation.

The pinch rollers 358, 360 have aligned central channels 374, 378 formed in their respective peripheries corresponding to those formed in the peripheries of the capstans. A second tape guide 380 extends vertically between the pinch rollers, the opposite ends of the tape guide passing within the confines of the peripheral channels 374, 378 so that the tape guide does not interfere with the engagement of the pinch rollers with the corresponding capstans. The second tape guide 380 is disposed substantially parallel to the first tape guide 356, and is carried by the arm 366 of the supporting frame 362, the connection being made by means of a pair of tabs 382, 384 extending from the second tape guide. The first tape guide 356 has a tab 386 by means of which it is fixed on the cover plate 334.

Thus, there is provided a substantially straight vertical path indicated by the phantom line 388 which passes between the first and second tape guides 356, 380 and between the protruding peripheries of the corresponding pinch rollers and capstans.

When the supporting frame 362 is pivoted alternatively either in one direction or the other about the pivot axle 368, the slight wobble play in the pinch rollers available through their single bearing mountings adjusts for any imperfections in the engagement of the respective split peripheries of the capstans and corresponding pinch rollers, which might otherwise result in the magnetic tape engaged between them being driven askew.

The normal position of the common supporting frame 362 is as illustrated in FIG. 17, and is maintained by a leaf spring 390 which urges the supporting frame to this neutral position about the pivot axle 368 so that neither pinch roller normally engages the tape with the corresponding capstan. The leaf spring 390 is connected to the arm 366 of the supporting frame 362 by means of a twist in the leaf spring and a pair of tabs 392, 394 extending past the twist. The opposite end of the leaf spring 390 is held in an adjustment 396, mounted on the cover plate 334.

The arms of the supporting frame 362 have upper rearward extensions which support an adjustment cam 398 in engagement with a tang 400 extending from the slow drive rotary solenoid 40. Similarly, the arms have lower rearward extensions which support an adjustment cam 402 in engagement with a tang 404 of the fast drive rotary solenoid 42. Thus, when energized, the respective solenoids 40, 42 pivot the support frame in opposite directions about its pivot axle 368 in opposition to the leaf spring 390. By virtue of the pivotal arrangement of the supporting frame, engagement of the tape with the fast drive and slow drive capstans cannot be simultaneous, but only in the alternative, which is an important fail-safe feature. In the structure illustrated, it will be noted that a pair of slots 406, 408 are formed in the cover plate 334 in order to accommodate some of the structure of the supporting frame and permit pivotal movement.

Commensurate with keeping the capstan drive assem-the tape transport system, actuation of the fast drive solenoid 42 pivots the common supporting frame 362 in the clockwise direction causing the lower pinch roller 360 to engage the tape 20 against the fast drive capstan 324 which is in constant motion at high speed, for example a peripheral speed of 120 inches per second. Instantly, tape shoots vertically downward and out of the capstan drive assembly 38 as if from a gun. The tape shoots directionally to engage the upper portion of the bin tape guide assembly 294 at a position above the uppermost louver 296 so that it strikes initially a mildly sloping 20° off of vertical surface, then deflects off of the uppermost of the louvers 296 out into the bin in violently moving serpentine folds. The second interior tape guide 300 of the bin deflects the tape folds down into the bin which otherwise might return out the tape entrance to the bin, particularly considering a co-mingling action of violently agitated serpentine folds resulting not only from the tape being shot into the bin but from the tape being withdrawn from the bin at a similarly high speed.

Commensurate with keeping the capstan drive assembly out of contact with the tape loops in the bin, it is desirable to have it located as close as possible to the entrance of the bin. It is significant that the fast drive capstan 324 is the lower capstan, because the slightest contact with the tape at this high speed produces violent deflections and loops in the tape.

Running the tape at very high speed produces static electricity which causes the tape to stick to itself and to practically everything else. This static electricity is not easily dissipated, and tends to remain. The use of metallic screens in the bin assists with this problem, so some extent and helps prevent the walls of the bin from building up an opposite charge and thereby magnifying the effect.

After finding the desired recording location on the tape, the slow drive solenoid 40 is actuated to pivot the supporting frame 362 counterclockwise and cause the upper pinch roller 358 to engage the tape against the slow drive capstan 322, which is disposed above the fast drive capstan. At this point the tape tends to stick to everything, because it is driven at a relatively slow speed, for example three inches per second, and it no longer has great momentum to carry it along and cause it to form into relatively small folds in the bin. At slow speed, reliance is had on the stiffness of the tape and on gravity to a certain extent in carrying the tape from the capstan 322 to the bin.

As the tape enters the bin at low speed, it rides along the edges of the series of louvers 296 of the tape guide assembly 294. These louvers minimize surface contact with the tape so that the tape forms reasonably small folds and carries well down into the bin, without sticking to the tape guide and forming into very large loops which then have a tendency to flip sideways causing the tape to stick to the bin, a serious problem upon the following engagement of the fast drive. The parallel tape guides and the capstan drive assembly help assure that the tape does not become there entangled at slow speed or at high speed.

The transition from high speed to low speed is initiated when the transparent window defining the leading edge of the tape segment containing the selected recording location passes adjacent the photo diodes, which are located about two inches from the recording head. At this moment, however, the tape is moving at about 120 inches per second and allowing about 20 milliseconds to reduce the tape speed to audio speed, it will be seen that the tape travels the necessary two inches or so to the recording head. The audio control relay 236 provides a corresponding delay in activating the audio circuit.

The 20 millisecond pulse from the one-shot pulse generator 216 applied to the fast drive solenoid at this time keeps the fast drive engaged for a short instant while the brake tang 320 is moving into engagement, so that minor loops of tape do not form in the tape drive system during the transition as a result of the drag force exerted by the spring mounted felt pad 48. Once the brake is engaged and the lower pinch roller 360 moves slightly away from the fast drive capstan 324, the tape moves very little until the slow drive capstan is engaged.

The following is claimed:

1. In a magnetic tape system for storing and selectively playing any of a plurality of audio recordings, the combination which comprises:

a closed loop of magnetic tape for storing a plurality of audio recordings in each one of a plurality of side by side track locations extending around the loop;

a bin for loosely supporting a major portion of the closed tape loop in stacked serpentine folds;

a tape drive system supporting a portion of the tape loop in cooperative relation to the bin for driving the tape at either of a relatively slow speed and a relatively fast speed many times greater than the slow speed;

a multiple channel recording head cooperative with the tape drive system and having a plurality of separate channels which operatively correspond to the plurality of side by side track locations on the tape;

an audio circuit;

identifying means cooperative with the tape drive system for identifying different recording locations along each track on the tape;

means for selecting a particular recording head channel and recording location along the corresponding track on the tape; and control means responsive to the selecting means and identifying means, said control means comprising means for first engaging the tape drive system at fast speed to bring the selected recording location into proximity with the recording head and secondly at slow speed to traverse the selected recording location across the recording head, and means for activating the audio circuit in conjunction with the selected recording head channel during the traverse of the selected recording location across the recording head.

2. In a magnetic tape system for storing and selectively playing any of a plurality of audio recordings, the combination which comprises:

a closed loop of magnetic tape for storing a plurality of audio recordings in each one of a plurality of side by side track locations extending around the loop, the audio recordings being grouped in successive segments of the tape, each segment containing a plurality of side by side recording locations corresponding to said tracks;

a bin for loosely supporting a major portion of the closed tape loop in stacked serpentine folds;

a tape drive system supporting a portion of the tape loop in cooperative relation to the bin for driving the tape at either of a relatively slow audio speed and a relatively fast search speed many times greater than the audio speed;

a multiple channel recording head cooperative with the tape drive system and having a plurality of separate channels which operatively correspond to the plurality of side by side track locations on the tape;

an audio circuit;

identifying means cooperative with the tape drive system for identifying successive tape segments;

means for selecting a particular tape segment and recording head channel so as to select a particular recording location on the tape; and, electrical controls responsive to the selecting means and identifying means, said electrical controls comprising means for activating the tape drive system at search speed to find the selected tape segment and then at audio speed to traverse the selected tape segment across the recording head, and means for activating the audio circuit in conjunction with the selected recording head channel during the traverse of the selected tape segment across the recording head.

3. In a magnetic tape system for storing and selectively playing any of a plurality of audio recordings, the combination which comprises:

a closed loop of magnetic tape for storing a plurality of audio recordings in each one of a plurality of side by side track locations extending around the loop, the audio recordings being grouped in successive segments of the tape, each segment containing a plurality of side by side recording locations corresponding to said tracks;

a bin for loosely supporting a major portion of the closed tape loop in stacked serpentine folds, the bin having an entrance opening and an exit opening for passage of the tape;

a tape drive system supporting a portion of the tape loop in cooperative relation to the bin entrance and exit openings, the tape drive system including tape driving means disposed adjacent the bin entrance opening for driving the tape into the bin alternatively at either of relatively slow audio speed and a relatively fast search speed many times greater than the audio speed, and brake means disposed adjacent the bin exit opening for applying an extraordinary drag force on the tape;
a multiple channel recording head engaging the tape loop portion in the tape drive system at a position between the tape driving means and the brake means, the recording head having a plurality of separate channels which operatively correspond to the plurality of side by side track locations on the tape;
an audio circuit;
identifying means cooperative with the tape drive system for identifying successive tape segments;
means for selecting a particular tape segment and recording head channel so as to select a particular recording location on the tape; and,
electrical controls responsive to the selecting means and identifying means, said electrical controls comprising means for activating the tape drive system at search speed to bring the selected tape segment into proximity with the recording head and then at audio speed to traverse the selected tape segment across the recording head, means for momentarily activating the brake means as the selected tape segment comes into proximity with the recording head at search speed, and means for activating the audio circuit in conjunction with the selected recording head channel during the traverse of the selected tape segment across the recording head.

4. In a magnetic tape system for storing and selectively playing any of a plurality of audio recordings the combination which comprises:
a closed loop of magnetic tape for storing a plurality of audio recordings in each one of a plurality of side by side track locations extending around the loop, the tape having indicia spaced along its length defining successive segments of the tape, each segment containing a plurality of side by side recording locations corresponding to said tracks;
a bin for loosely supporting a major portion of the closed tape loop in stacked serpentine folds;
a tape drive system supporting a portion of the tape loop in cooperative relation to the bin for driving the tape at either of a relatively slow audio speed and a relatively fast search speed many times greater than the audio speed;
a multiple channel recording head cooperative with the tape drive system and having a plurality of separate channels which operatively correspond to the plurality of side by side track locations on the tape;
an audio circuit;
identifying means, cooperative with the tape drive system and including photoelectric means sensitive to said tape indicia, for identifying successive tape segments;
means for selecting a particular tape segment and recording head channel so as to select a particular recording location on the tape; and,
electrical controls responsive to the selecting means and identifying means, said electrical controls comprising means for activating the tape drive system at search speed to find the selected tape segment and then at audio speed to traverse the selected tape segment across the recording head, and means for activating the audio circuit in conjunction with the selected recording head channel during the traverse of the slected tape segment across the recording head.

5. In a magnetic tape system for storing and selectively playing any of a plurality of audio recordings, the combination which comprises:
a closed loop of magnetic tape for storing a plurality of audio recordings in each one of a plurality of side by side track locations extending around the loop;
a substantially upright bin slightly wider than the tape for loosely supporting a major portion of the closed tape loop in stacked serpentine folds, the bin having an entrance opening adjacent the top thereof through which the tape enters and having an exit opening through which the tape exits,
a tape drive system supporting a portion of the tape loop in cooperative relation to the bin entrance and exit openings, said tape drive system including first and second rotary capstans disposed adjacent to and in alignment with the bin entrance opening for driving the tape directionally into the bin at a relatively slow audio speed and at a relatively fast search speed respectively, means for driving the first and second capstans at appropriate peripheral speeds, and means for engaging the tape alternatively with the first and second capstans,
a multiple channel recording head cooperative with the tape drive system and having a plurality of separate channels which operatively correspond to the plurality of side by side track locations on the tape;
an audio circuit;
identifying means cooperative with the tape drive system for identifying different recording locations along each track on the tape;
means for selecting a particular recording head channel and recording location along the corresponding track on the tape; and,
control means responsive to the selecting means and identifying means, said control means comprising means for first engaging the tape drive system at fast speed to bring the selected recording location into proximity with the recording head and secondly at slow speed to traverse the selected recording location across the recording head, and means for activating the audio circuit in conjunction with the selected recording head channel during the traverse of the selected recording location across the recording head.

6. In a magnetic tape system for storing and selectively playing any of a plurality of audio recordings, the combination which comprises:
a closed loop of magnetic tape for storing a plurality of audio recordings in each one of a plurality of side by side track locations extending around the loop, the tape having indicia spaced along its length defining successive segments of the tape, each segment containing a plurality of side by side recording locations corresponding to said tracks;
a substantially upright bin for loosely supporting a major portion of the closed tape loop in stacked serpentine folds;
the bin having a tape entrance opening disposed to one side at the top thereof, and having a tape exit opening, and the bin including:
a tape guide sloping downwardly from the bin entrance opening and having a series of louvers along its length for guiding the tape with minimum surface contact;
a tape drive system for supporting and driving a portion of the tape loop in cooperative relation to the bin entrance and exit openings, said tape drive system including:
first and second rotary capstans aligned with the bin entrance opening for driving the tape directionally into the bin at a relatively slow audio speed and at a relatively fast search speed respectively, the respective peripheries of the capstans being aligned tangent to a substantially vertical path which intersects the tape guide at a position adjacent the bin entrance and slightly above the uppermost louver, so that the uppermost louver deflects the tape at search speed and so that the tape rides along the edges of the louvers at audio speed;
means for driving the first and second capstans at a relatively slow and a relatively fast peripheral speed respectively;

first and second pinch rollers for engaging the tape with the first and second capstans respectively;

a common supporting frame mounting the first and second pinch rollers respectively adjacent the first and second capstans;

means pivotally mounting the supporting frame on an axis disposed between the pinch rollers;

spring means for urging the supporting frame to a neutral position about the pivot axis where neither pinch roller engages the tape with the corresponding capstan;

solenoid means for pivoting the supporting frame in opposite directions about the pivot axis in opposition to the spring means to alternatively engage the tape with the first and second capstans; and, brake means disposed adjacent the bin exit opening for applying an extraordinary drag force on the tape;

a multiple channel recording head engaging the tape loop portion in the tape drive system at a position between the tape driving means and the brake means, the recording head having a plurality of separate channels which operatively correspond to the plurality of side by side track locations on the tape;

an audio circuit;

identifying means, cooperative with the tape drive system and including photoelectric means sensitive to said tape indicia, for identifying successive tape segments;

means for selecting a particular tape segment and recording head channel so as to select a particular recording location on the tape; and, electrical controls responsive to the selecting means and identifying means, said electrical controls comprising means for activating the solenoid means to engage the tape drive system at search speed to bring the selected tape segment into proximity with the recording head and then at audio speed to traverse the selected tape segment across the recording head, means for momentarily activating the brake means as the selected tape segment comes into proximity with the recording head at search speed, and means for activating the audio circuit in conjunction with the selected recording head channel during the traverse of the selected tape segment across the recording head.

References Cited by the Examiner

UNITED STATES PATENTS

| | | | |
|---|---|---|---|
| 743,419 | 11/1903 | Armat | 226—118 |
| 2,608,778 | 9/1952 | O'Gorman | 226—118 |
| 2,683,568 | 7/1954 | Lindsay | 179—100.2 |
| 2,865,639 | 12/1958 | Gillette | 274—11 |
| 2,908,767 | 10/1959 | Fritzenger | 226—118 |
| 2,979,244 | 4/1961 | Pouliart | 226—118 |
| 2,988,604 | 6/1961 | Nye | 179—100.2 |
| 2,989,594 | 6/1961 | McKaig | 179—100.2 |
| 3,021,989 | 2/1962 | Sellers | 226—118 |
| 3,048,315 | 8/1962 | Pankratz | 226—118 |
| 3,080,169 | 3/1963 | Lyon | 274—11 |
| 3,115,289 | 12/1963 | Namenyi-Katz | 179—100.2 |

NORTON ANSHER, *Primary Examiner.*